Figure 1:
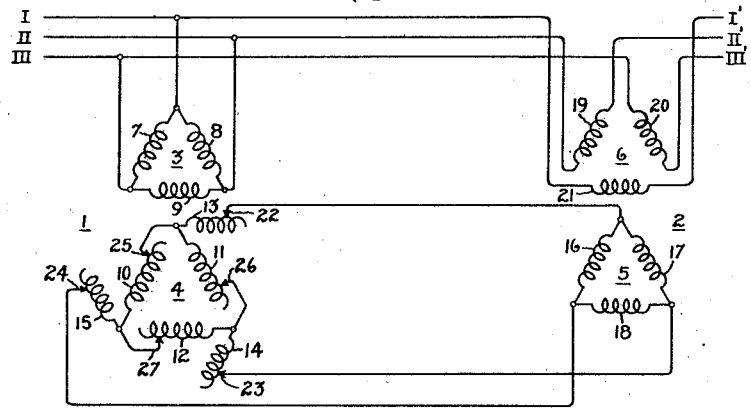

Sept. 14, 1943.          Z. O. ST. PALLEY          2,329,229
                        REGULATING CIRCUIT
                     Filed Jan. 28, 1942          2 Sheets-Sheet 1

Inventor:
Zoltan O. St. Pailey,
by Harry E. Dunham
His Attorney.

Sept. 14, 1943.   Z. O. ST. PALLEY   2,329,229
REGULATING CIRCUIT
Filed Jan. 28, 1942   2 Sheets-Sheet 2

Inventor:
Zoltan O. St. Palley,
by Harry E. Dunham
His Attorney.

Patented Sept. 14, 1943

2,329,229

UNITED STATES PATENT OFFICE 2,329,229

REGULATING CIRCUIT

Zoltan O. St. Palley, Pittsfield, Mass., assignor to General Electric Company, a corporation of New York Application January 28, 1942, Serial No. 428,479

16 Claims. (Cl. 172—238)

This invention relates to electrical regulating circuits and more particularly to improvements in alternating current voltage regulating circuits of the variable ratio transformer type.

Voltage regulating transformers and transformer systems of the type in which the relative magnitude of two quadrature related voltage components may be adjusted are old in the art. Such arrangements are often used for interconnecting two alternating current power circuits, in which case one of the voltage components is usually in phase with the voltage of one of the circuits and the other component is therefore in quadrature therewith. The relative adjustment of these components makes it possible to adjust the active and reactive volt-amperes in the circuit when such interconnection closes a loop circuit.

In accordance with this invention there is provided a novel arrangement of three transformer windings per phase for providing the desired quadrature related voltage components. For polyphase application it is not necessary to have three times as many separate windings as there are phases and an arrangement of six windings may conveniently constitute the secondary winding of a three-phase transformer to which the conductors of a three-phase circuit may be connected. When the transformer is an exciting transformer this three-phase circuit is particularly adapted to energize a delta-connected primary winding of a series transformer whose secondary winding is connected in the main power circuit or which may be considered as interconnecting two main power circuits.

The use of a conventional type series transformer with a closed mesh connected primary winding is another feature of this invention because such a connection provides a circulating path for reflected zero sequence currents whose originals flow in the main power circuit. These zero sequence currents result from ground faults on the main power circuit and if the series transformer primary winding is connected in any other way these currents must flow through the secondary winding of the exciting transformer thereby substantially increasing the duty on the ratio adjusting means for the exciting transformer.

An object of the invention is to provide a new and improved regulating system.

Another object of the invention is to provide an in-phase and quadrature voltage control regulating transformer system which is characterized by a novel and simple arrangement of transformer windings.

A further object of the invention is to provide a voltage phase angle and magnitude regulating transformer system which is characterized by the use of a series transformer having a delta-connected primary winding.

The invention will be better understood from the following description taken in connection with the accompanying drawings and its scope will be pointed out in the appended claims.

Figure 2:
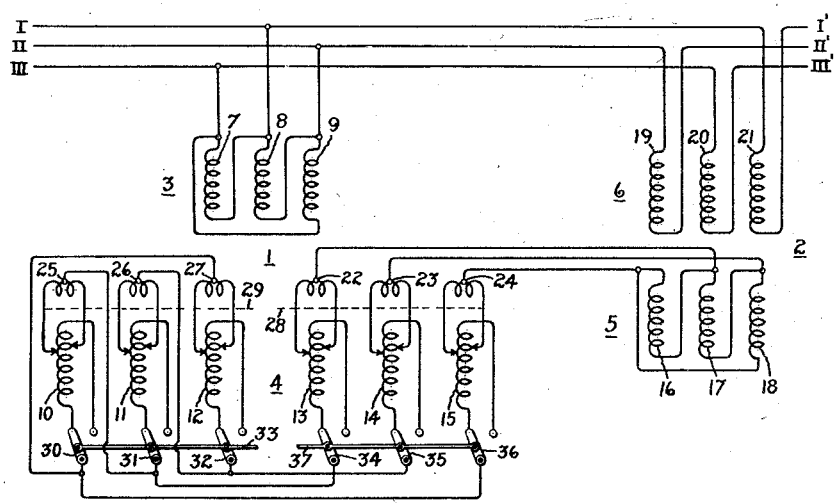
Figure 3:
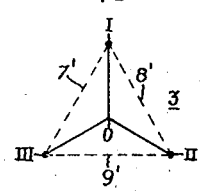
Figure 4:
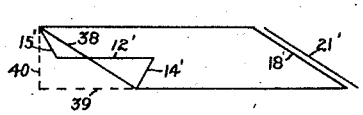
Figure 5:
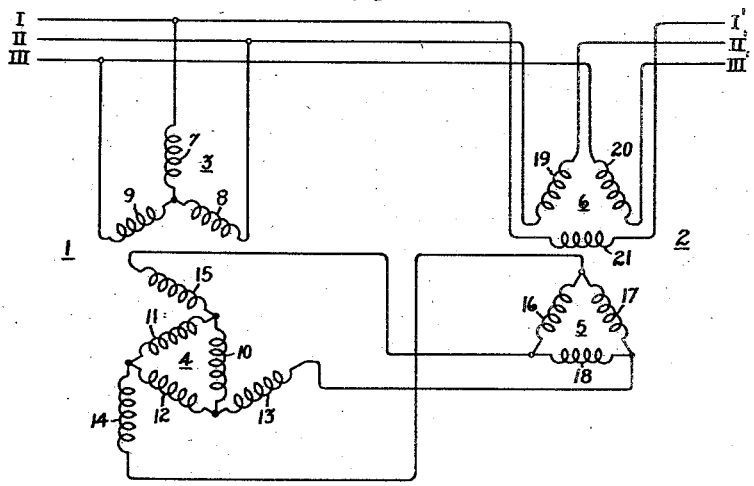
Figure 6:
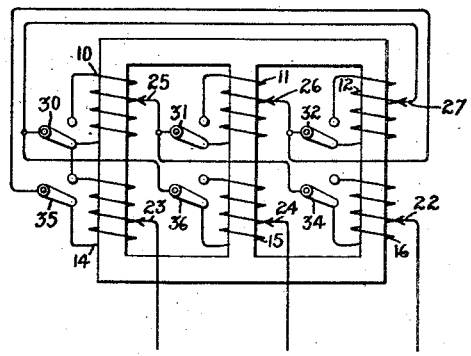

In the drawings Fig. 1 illustrates diagrammatically an embodiment of the invention in which the transformer windings are laid out so as to show the phase relations of their voltages, Fig. 2 shows the circuit of Fig. 1 with the windings arranged in conventional manner and with the addition of polarity reversing switches and modified tap-changing means, Fig. 3 is a vector diagram showing the relation between the line-to-line and line-to-neutral voltages of the exciting circuit and the phase voltages of the primary winding of the exciting transformer, Fig. 4 is a vector diagram of the voltages of one phase of the secondary winding of the exciting transformer and of the primary and secondary voltages of the corresponding phase of the series transformer, Fig. 5 is a modification similar to Fig. 1 but showing a star-connected primary winding for the exciting transformer, and Fig. 6 shows the physical arrangement of the regulating windings.

Referring now to the drawings and more particularly to Fig. 1, there is shown therein a pair of main three-phase power circuits having phase conductors I, II and III and I', II' and III' respectively. The voltage between these circuits is regulated by a transformer system comprising an exciting transformer 1 and a series transformer 2. The exciting transformer has a primary winding 3 connected across the main circuit I, II and III and has a secondary winding 4 consisting of two sets of three phase windings. The series transformer has a delta-connected primary winding 5 which is excited by the secondary winding 4 of the exciting transformer and which in turn excites a secondary winding 6 whose phase windings interconnect the corresponding phase conductors of the two main power circuits.

The individual phase windings of the primary winding 3 of the exciting transformer are designated as 7, 8 and 9 and three of the corresponding secondary phase windings, designated as 10, 11 and 12, are also delta connected. Each of the remaining secondary phase windings 13, 14 and 15 are connected respectively to the corner of the delta formed by the two phase windings thereof which are out of phase with said remaining winding. In other words, winding 13 is connected to the corner formed by the interconnection of 10 and 11, winding 14 is connected to the corner of the delta formed by the connection of windings 11 and 12, etc. The output of the secondary winding 4 is derived from corresponding points on the windings 13, 14 and 15 and these points are connected to the corners of the delta primary winding 5 of the series transformer. As shown, this delta winding comprises the phase windings 16, 17 and 18 which excite respectively the phase windings 19, 20 and 21 of the secondary winding 6 of the exciting transformer.

By means of this connection it will be seen that each phase winding of the primary winding 5 is excited by three series voltages. One of these voltages is the voltage of one of the phase windings of the three delta-connected secondary windings 10, 11 and 12, the remaining two voltages being the voltages of two of the windings 13, 14 and 15. For example, the primary phase winding 18 of the series transformer is excited by the voltages of the windings 15, 12 and 14 in series. As can be seen from the drawings and as will be explained more fully hereafter, the resultant of the voltages of windings 14 and 15 is in quadrature with the voltage of the winding 12 so that if the voltages of the windings 14 and 15 are adjusted simultaneously so as to maintain equality between them for different values thereof the magnitude of their resultant voltage, which is in quadrature with the voltage of winding 12, will be varied relative to the latter. The effective voltages of the windings 13, 14 and 15 may conveniently be adjusted by means of tap changers or load ratio control mechanisms 22, 23 and 24 respectively. Similarly, the effective voltages of the delta-connected secondary phase windings 10, 11 and 12 may be adjusted by means of similar mechanisms 25, 26 and 27 respectively.

As previously stated, Fig. 2 shows the same electrical connections between the windings as in Fig. 1 but the windings are arranged diagrammatically in conventional manner instead of for showing the phase relations of their respective voltages. In addition, a more detailed showing has been made of a particular form of tap changer which is suitable for use in the circuit. This tap changer consists of a double movable contact finger arrangement which is connected to the circuit or adjustable lead of the winding by means of a mid-tapped reactor for controlling circulating current when the fingers are on different voltage taps. This is a well-known arrangement and permits the changing of taps without opening the winding circuit.

For convenience of operation, the individual tap changers 22, 23 and 24 are provided with a common operating mechanism which may be of any well-known type and which is shown schematically and designated as 28. Similarly, the three tap changers 25, 26 and 27 for the delta phase windings 10, 11 and 12 have a common operating mechanism 29.

For increasing the range of control or adjustment of the system means is provided for reversing the phase of the effective voltages of windings 10, 11 and 12 on the one hand and of windings 13, 14 and 15 on the other hand. In the case of the windings 10, 11 and 12 this reversing means may consist of separate reversing switches 30, 31 and 32 interconnected by a common operating member 33 and similarly this reversing means for the windings 13, 14 and 15 may consist of reversing switches 34, 35 and 36 interconnected by a common operating member 37.

The operation of Figs. 1 and 2 may best be understood by reference to Figs. 3 and 4. In Fig. 3 the dots I, II and III may be taken to represent in cross section the phase conductors of the power circuit across which the primary winding 3 of the exciting transformer 1 is connected. The voltages of the phase windings of this delta-connected winding are designated as 7', 8' and 9' while the neutral point of the system is shown as 0 and the line-to-neutral voltages are represented by the vectors connecting the neutral point 0 with the phase conductors I, II and III.

Fig. 4 shows the vector relations between the voltages of the phase of the secondary winding 4 of the exciting transformer which excites the phase winding 18 of the primary winding of the series transformer. In this figure the vector 12' represents the voltage of the phase winding 12 which, as will be seen by comparison with Fig. 3, is in phase with the voltage 9' corresponding to the voltage of the primary phase winding 9. This voltage is at right angles to the line-to-neutral or phase voltage of the conductor I. The vectors 15' and 14' represent the voltages of the windings 14 and 15. The vector resultant of the three voltages 15', 14' and 12' is the vector 38. This vector in turn may be thought of or resolved into two quadrature components 39 and 40. Component 39 is equal in magnitude to 12' and is in quadrature with the line-to-neutral voltage of conductor I. Component 40 is equal to the vector difference between 15' and 14' and is in phase with the line-to-neutral voltage of conductor I. The voltage of the phase 18 of the primary winding 5 of the series transformer is the same as the resultant voltage 38 because that is the voltage which is impressed across this winding. Consequently, the voltage of the corresponding phase 21 of the secondary winding of the series transformer is in phase with the vector 38 and as is shown the phase winding 21 is connected in series with the conductor 15. Consequently, there is inserted in series with the conductor I a voltage having a component in phase with its phase voltage and having two other components whose resultant is in quadrature with its phase voltage or voltage to neutral. As the system shown is symmetrical it follows that the phase windings 19 and 20 also have induced therein voltages whose components bear the same relation to their main circuit conductor voltage as exists for the voltage induced in the phase winding 21.

By operating the common driving mechanism 28 for the adjusters 22, 23 and 24 the voltages of the windings 13, 14 and 15 are simultaneously and equally adjusted thereby to adjust the in-phase component of the regulating voltage. Similarly, operation of the common driving mechanism 29 for the ratio adjusters 25, 26 and 27 simultaneously and equally adjusts the effective voltages of the windings 10, 11 and 12 thereby simultaneously and equally adjusting the quadrature components of the regulating voltage.

Operation of the member 33 serves to reverse the switches 30, 31 and 32 from their illustrated position to the opposite position so as to reverse the effective voltages of the windings 10, 11 and 12. In this manner the quadrature component of the regulating voltage may be either a leading voltage or a lagging voltage. In a like manner operation of the member 37 throws the switches 34, 35 and 36 from their illustrated positions to their opposite positions so as to reverse the effective voltages of the windings 13, 14 and 15. In this manner the in-phase component of the regulating voltage may be either a boosting voltage or a bucking voltage.

Fig. 5 differs from Fig. 1 in that the phase windings 7, 8 and 9 of the primary winding 3 of the exciting transformer 1 are Y connected instead of delta connected. This reverses the phase relation of the delta windings 10, 11 and 12 and the remaining windings 13, 14 and 15 with respect to the line-to-neutral voltages of the main circuit I, II and III. In other words, the voltages of the delta-connected windings 10, 11 and 12 now produce the in-phase components of the regulating voltage instead of the quadrature components as in Figs. 1 and 2 and the voltages of the windings 13, 14 and 15 combine in pairs to produce the quadrature components of the regulating voltage.

While the ratio adjusters and reversing switches have been omitted from Fig. 5, it will be understood that these may be employed in a manner similar to that shown in Fig. 2 if desired.

Fig. 6 shows one form of physical arrangement of the phase windings 10, 11, 12, 13, 14 and 15 on a three-legged magnetic core 41. Although these six windings have previously been considered as constituting the secondary winding 4 of the exciting transformer 1 it should be understood that my invention is not limited to such use of these six windings and that their output circuit may supply directly the regulating voltage having the relatively adjustable in-phase and quadrature components. Furthermore, they do not necessarily constitute the secondary winding of a transformer which is excited by another winding and they may equally well be considered to constitute an autotransformer in which the necessary excitation is provided by connecting a three-phase supply circuit to corresponding points in three corresponding windings on the different legs. This figure shows more clearly the physical relationship between the delta-connected windings 10, 11 and 12 on the one hand and the remaining windings 13, 14 and 15 on the other hand. Thus, although the winding 14 is on the same leg with 10 it is connected through the reversing switch 35 to the corner of the delta formed by the interconnection of the phase windings 11 and 12 which are on the remaining two legs and as will be seen the same is also true for the windings 13 and 14.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of my invention.

What I claim as new and desire to secure by Letters Patent in the United States is:

1. A voltage regulating transformer system for a polyphase circuit comprising, in combination, an exciting transformer and a series transformer, said series transformer having a closed mesh-connected primary winding, said exciting transformer having a multi-tapped secondary winding, and means including tap changers associated with said multi-tapped winding for impressing across each phase of said delta-connected winding a plurality of voltages in series which are derived from said secondary winding, said tap changers being divided into two sets for respectively varying quadrature related sets of said voltages.

2. A voltage regulating transformer system for a polyphase circuit comprising, in combination, an exciting transformer and a series transformer, said series transformer having a closed mesh-connected primary winding, said exciting transformer having a multi-tapped secondary winding, and means including tap changers associated with said multi-tapped winding for impressing across each phase of said mesh-connected winding a plurality of voltages in series which are derived from said secondary winding, there being three tap changers connected in circuit with each of said phases for separately adjusting quadrature components of the resultant voltant voltage impressed across each of said phases.

3. A voltage regulating transformer system for a polyphase circuit comprising, in combination, an exciting transformer and a series transformer, said series transformer having a closed mesh-connected primary winding, said exciting transformer having a multi-tapped secondary winding, and means including tap changers associated with said multi-tapped winding for impressing across each phase of said mesh-connected winding a plurality of voltages in series which are derived from said secondary winding, there being three tap changers connected in circuit with each of said phases for separately adjusting one of said voltages and a pair of said voltages whose resultant is in quadrature with said one voltage.

4. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, and means including said tap changers for connecting each of the delta phase windings across a different phase winding of one of said sets in series with a different pair of phase windings of the other of said sets.

5. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, and means including said tap changers for connecting each of the delta phase windings across a different phase winding of one of said sets in series with a different pair of phase windings of the other of said sets, one of said sets being delta connected.

6. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, means including said tap changers for connecting each of the delta phase windings across a different phase winding of one of said sets in series with a different pair of phase windings of the other of said sets, and a set of reversing switches for reversing the windings of one of said sets.

7. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, means including said tap changers for connecting each of the delta phase windings across a different phase winding of one of said sets in series with a different pair of phase windings of the other of said sets, and two sets of reversing switches for reversing the windings of each of said sets respectively.

8. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, means including said tap changers for connecting each of the delta phase windings across a different phase winding of one of said sets in series with a different pair of phase windings of the other of said sets, and means for operating the tap changers of one of said sets in unison.

9. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, means including said tap changers for connecting each of the delta phase windings across a different phase winding of one of said sets in series with a different pair of phase windings of the other of said sets, and means for operating the tap changers of one of said sets in unison and separate means for operating the tap changers of the other of said sets in unison.

10. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformers having two sets of three secondary phase windings, a separate tap changer for varying the effective number of turns of each of the six secondary phase windings, and means including said tap changers for connecting each of the delta phase windings across a different phase winding of one of said sets in series with a different pair of phase windings of the other of said sets, said exciting transformer having a delta-connected primary winding.

11. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, and means including said tap changers for connecting each of the delta phase windings across a different phase winding of one of said sets in series with a different pair of phase windings of the other of said sets, said exciting transformer having a Y-connected primary winding.

12. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, and means including said tap changers for connecting each of the delta phase windings across a different phase winding of one of said sets in series with a different pair of phase windings of the other of said sets, the resultant voltage of each of said pairs of phase windings being in quadrature with the voltage of the serially connected winding of the other set.

13. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, and means including said tap changers for connecting each of the delta phase windings across a different phase winding of one of said sets in series with a different pair of phase windings of the other of said sets, the resultant voltage of each of said pairs of phase windings being in phase with a different one of the line-to-neutral voltages of the primary winding of said exciting transformer.

14. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, and means including said tap changers for connecting each of the delta phase windings across a different phase winding of one of said sets in series with a different pair of phase windings of the other of said sets, the resultant voltage of each of said pairs of phase windings being in quadrature with a different one of the line-to-neutral voltages of the primary winding of said exciting transformer.

15. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, and means including said tap changers for connecting each of the delta phase windings across a different phase winding of one of said sets in series with a different pair of phase windings of the other of said sets, the voltage of each of said phase windings which is connected in series with a different pair of phase windings of the other set being in quadrature with a different one of the line-to-neutral voltages of the primary winding of said exciting transformer.

16. A voltage regulating transformer system for interconnecting a pair of three-phase power circuits comprising, in combination, a series transformer whose secondary phase windings interconnect respectively the corresponding phase conductors of said circuits and whose primary winding is delta connected, an exciting transformer connected across one of said circuits, said exciting transformer having two sets of three secondary phase windings, a separate tap changer for varying the effective number of turns of each of the six secondary phase windings, and means including said tap changers for connecting each of the delta phase windings across a different phase winding of one of said sets in series with a different pair of phase windings of the other of said sets, the voltage of each of said phase windings which is connected in series with a different pair of phase windings of the other set being in phase with a different one of the line-to-neutral voltages of the primary winding of said exciting transformer.

ZOLTAN O. ST. PALLEY.